United States Patent [19]

Ritter

[11] 4,194,145

[45] Mar. 18, 1980

[54] METHOD FOR MONITORING THE RUN-UP TO SPEED OF ASYNCHRONOUS MOTORS AND APPARATUS FOR THE PERFORMANCE THEREOF

[75] Inventor: Franz Ritter, Fislisbach, Switzerland

[73] Assignee: BBC Brown Boveri & Company Limited, Baden, Switzerland

[21] Appl. No.: 876,630

[22] Filed: Feb. 10, 1978

[30] Foreign Application Priority Data

Mar. 4, 1977 [CH] Switzerland ........................ 2701/77

[51] Int. Cl.² ............................................. H02P 1/04
[52] U.S. Cl. .................................... 318/799; 318/431; 318/438; 318/778; 361/79; 361/85
[58] Field of Search ............... 318/430, 431, 434, 438, 318/474, 478, 479, 778, 799; 361/30, 79, 85

[56] References Cited

U.S. PATENT DOCUMENTS 2,992,365  7/1961  Brill ........................................ 361/79

*Primary Examiner*—David Smith, Jr.
*Assistant Examiner*—Michael R. Mutter
*Attorney, Agent, or Firm*—Werner W. Kleeman

[57] ABSTRACT

A method of, and apparatus for, monitoring the run-up to speed of asynchronous motors which are turned-off within a permissible blocking or cutoff time of the motor when the speed run-up is improper, wherein after turning-on the motor there is determined a first value of an electrical magnitude which is dependent upon the phase angle between the motor current and the motor voltage after expiration of a first time-delay following turning-on of the motor, and there is then determined a second value of said electrical magnitude after expiration of a second time-delay following the turning-on of the motor. Both the first and second values are compared with one another, and the motor is turned-off when, following such comparison, there is present a magnitude indicative of improper run-up to speed of the motor.

15 Claims, 2 Drawing Figures

METHOD FOR MONITORING THE RUN-UP TO SPEED OF ASYNCHRONOUS MOTORS AND APPARATUS FOR THE PERFORMANCE THEREOF

BACKGROUND OF THE INVENTION

The present invention relates to a new and improved method of, and apparatus for, monitoring the run-up to speed of—preferably explosion protected—asynchronous motors by detecting a physical magnitude which is dependent upon the motor rotational speed within a permissible motor blocking or cutoff time.

During the monitoring or supervising of the run-up to speed of motors it is absolutely compulsory for certain applications, such as for instance for motors protected against explosions where there is prevented too pronounced heating of the windings through which the current flows by blocking or shutting down the motor upon improper speed run-up, that the permissible motor blocking or cutoff time $t_E$ to chosen smaller than the startup time $t_A$. With prior art methods for monitoring the run-up to speed of asynchronous motors it is conventional practice to detect the motor rotational speed directly by means of a rotational speed monitor, after turning-on the motor, and following expiration of a predetermined time-delay falling within the motor blocking time. If after having applied voltage to the motor the latter, following expiration of the set time-delay, still has not reached a predetermined rotational speed, e.g. 40% n, then such motor is again disconnected from its power supply or voltage source. Yet, such monitoring method is expensive and complicated since it is necessary to mount a device for monitoring the rotational speed of the motor upon its shaft, and furthermore, the reproducibility of the obtained measurement result is questionable.

SUMMARY OF THE INVENTION

Hence, with the foregoing in mind it is a primary object of the present invention to provide an improved method of, and apparatus for, monitoring the run-up to speed of motors in a manner not associated with the aforementioned drawbacks and shortcomings of the prior art proposals.

Still a further significant object of the present invention is directed to a new and improved method of, and apparatus for, monitoring the run-up to speed of asynchronous motors, preferably explosion protected asynchronous motors, by supervising during a predetermined time interval the run-up conditions prevailing at the motor as its comes up to speed, and upon improper run-up of the motor to speed shutting-off the same within a predetermined motor blocking or cutoff time.

Yet a further extremely important and more specific object of the present invention aims at the provision of a method and apparatus for monitoring the run-up to speed of asynchronous motors, wherein through the exploitation of exclusively determined electrical magnitudes it is possible to render clear and reproducible statements concerning the operating state of the motor, and wherein, the concepts of the invention can be carried out with equipment requiring very little, if any, maintenance and an exceedingly small amount of space.

A further important object of the present invention is directed to a method of, and apparatus for, supervising the run-up to speed of motors in an extremely reliable, accurate and safe manner, requiring very little equipment expenditure, and obtaining purely on an electrical basis, values dependent upon parameters indicative of the speed run-up of the motor, and which values are then effectively exploited for motor cutoff when the latter improperly runs-up to speed.

Now in order to implement these and still further objects of the invention, which will become more readily apparent as the description proceeds, the method aspects of the present invention for monitoring the run-up to speed of an asynchronous motor, contemplates, after turning-on the motor, that there is determined a first value of an electrical magnitude which is dependent upon the phase angle between the motor current and the motor voltage after expiration of a first time-delay following turning-on of the motor. There is then determined a second value of such electrical magnitude which is dependent upon the phase angle between the motor current and the motor voltage after expiration of a second time-delay following turning-on of the motor. Both the first and second values are compared with one another, and the motor is turned-off when, following such comparison, there is present an error magnitude indicative of improper run-up to speed of the motor.

As already mentioned above, not only is the invention concerned with the aforementioned method aspects, but also deals with apparatus for the performance thereof. As to such apparatus, broadly speaking there are provided means for converting the current and voltage signals delivered by the supervised motor, means for initiating and determining the duration of the measurement of the phase angle-dependent magnitudes, and means for determining the change as a function of time of the phase angle-dependent magnitudes and for delivering a trigger command for cutting-off the motor during improper run-up to speed thereof.

In addition to the reliability and absence of problems which are advantageously realized when utilizing a monitoring device or equipment as contemplated by the invention, the method of the present development is particularly distinguished by the fact it can be beneficially employed especially in nuclear power plants where, with coolant-pump motors, it is forbidden to enter the motor room or with other installations where for operational reasons a rotational speed monitoring device cannot be visually observed and serviced.

The inventive method and apparatus are predicated upon the recognition that during the run-up to speed of an asynchronous motor, the value of a magnitude which is dependent upon the phase angle $\varphi$ between the motor current I and the motor voltage U, for instance the effective resistance $R = U/I \cdot \cos \varphi$, with which the motor opposes the network, markedly changes. This change is brought about by virtue of the fact that the delivered mechanical output is added to the actual ohmic resistance of the motor. Since the mechanical output cannot be measured when the rotational speed disappears, the change in such output and, thus, a change of the effective resistance R only then occurs when the motor accelerates. Accordingly, there is detected the dependency of the motor rotational speed upon the phase angle $\varphi$ and such is utilized for the practice of the inventive method.

It is recommended to select the first time-delay such that direct-current components which have arisen during turning-on of the motor have essentially decayed during the determination of the value of the phase angle-dependent magnitudes.

In order to perform the method there is simply connected an electronic measuring or monitoring device to a current and voltage converter of the motor. According to specific aspects of the invention, at such measuring device there are set the time-delays as well as the rated motor current. The measuring operation is initiated upon exceeding a predetermined current peak value. There is stored the value $A_1$ of the phase angle-dependent magnitude which has been determined after the first time-delay. There is determined the value $A_2$ of the phase angle-dependent magnitude after expiration of the second time-delay. To the value $A_1$ there is added a value B serving as a safety margin. The value $A_1$ which has been increased by the safety margin-value B is compared with the value $A_2$, and when the value $A_1$ increased by the margin B exceeds the value $A_2$, there is initiated turning-off of the motor. Such contemplated method of the invention for monitoring the run-up to speed of asynchronous motors is extremely advantageous, since there need only be connected an electronic measuring or monitoring device with the voltage and current e.g. the voltage and current converter of the motor. After adjusting or setting the time-delays characteristic of the motor intended to be protected, in other words, the time span $t_1$ needed for the decay of the direct-current components after turning-on the motor and the time span $t_2$ which, at most, can be chosen to be as large as the motor blocking or cutoff time $t_E$ as well as the rated current $I_N$ of the motor, the apparatus provided for the performance of the inventive method is ready for use without the need for any complicated maintenance work over larger time intervals. Since only electrical measurement values are detected, it is unnecessary that their evaluation be accomplished at the direct region or site of the motor, rather these measurement values can be easily and without any particular equipment expenditure transmitted to a remotely situated room or area for evaluation. Additionally, it is also of advantage that the inventive method is effective first upon exceeding a predetermined current peak value (e.g. 2 $I_N$, wherein $I_N$ = rated current of the motor), so that load changes brought about during operation and voltage fluctuations in the power supply network cannot cause faulty behavior of the monitoring system.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various Figures there have been generally used the same reference characters for the same or analogous components, and wherein.

DETAILED DESCRIPTION OF THE PREFERRED EMBODIMENTS

Figure 2:
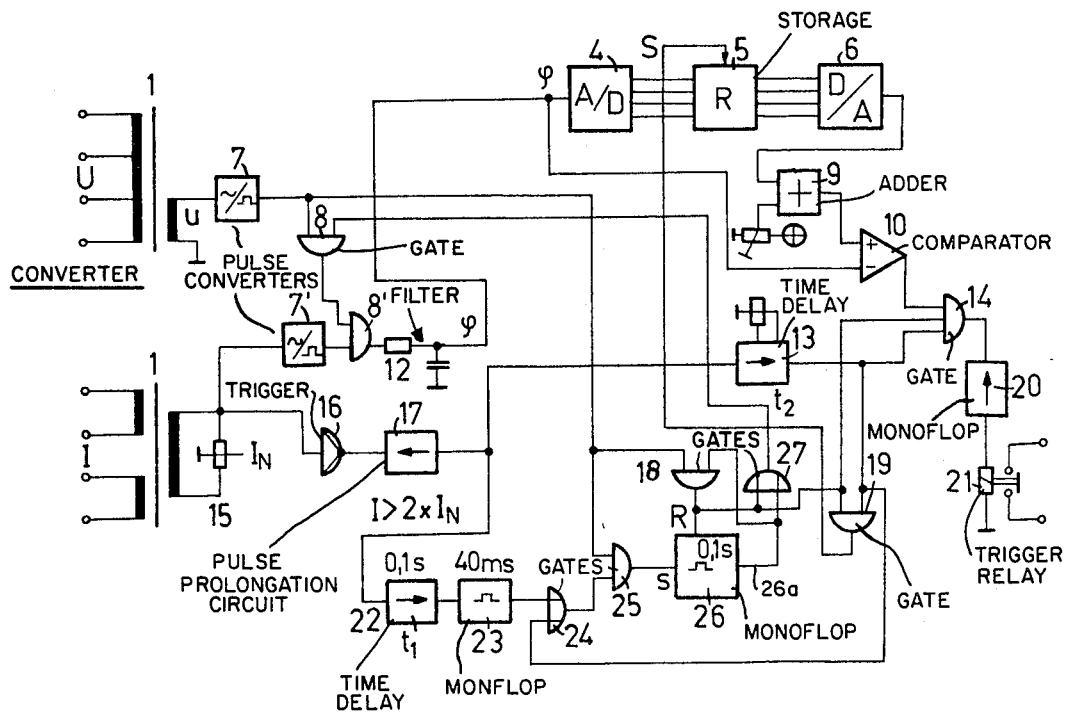
FIG. 2 illustrates a second embodiment of apparatus, employed for the practice of the method teachings, specifically showing monitoring circuitry in the form of a relay circuit designed such that phase angle $\varphi$ between the motor current I and the motor voltage U is employed as the phase angle-dependent magnitude.
Figure 1:
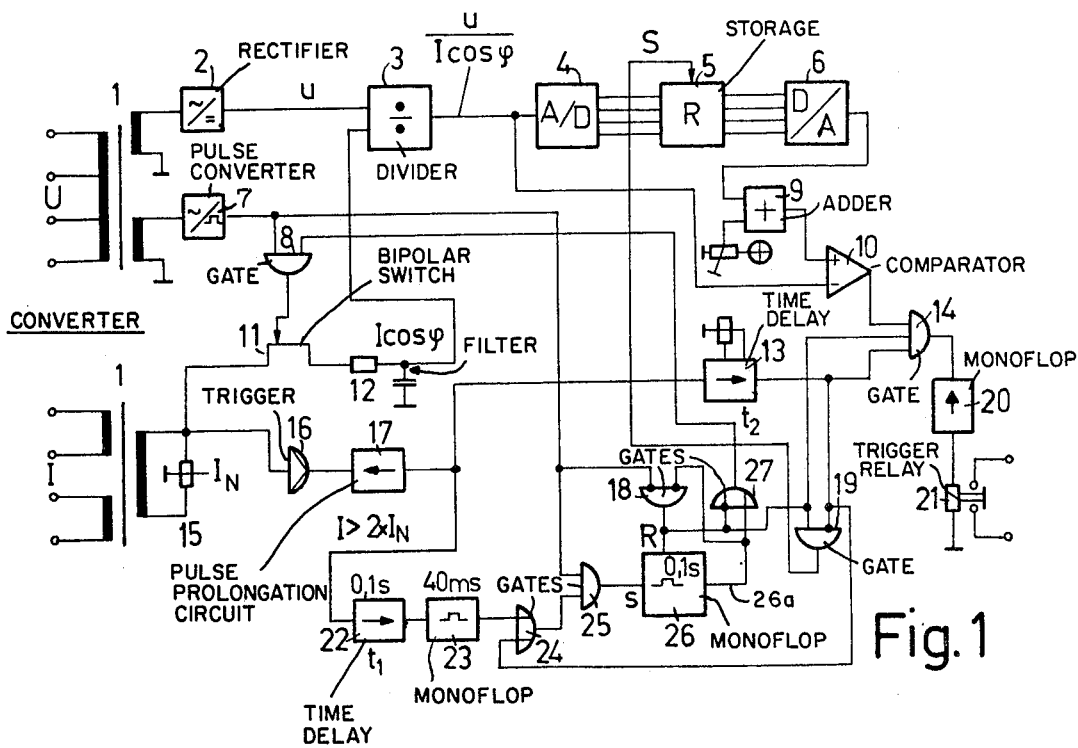
FIG. 1 is a block circuit diagram of apparatus for monitoring the run-up to speed of asynchronous motors, useful in the practice of the method aspects, and specifically illustrating a first embodiment of monitoring circuit in the form of a relay circuit wherein the effective resistance of the supervised motor is used as a phase angle-dependent magnitude.

Describing now the drawings, in FIGS. 1 and 2 there are shown two different embodiments of monitoring or measuring apparatus for supervising the run-up to speed of asynchronous motors which are turned-off within a permissible blocking time of the motor when the speed run-up is improper. Turning specifically attention to the first exemplary embodiment of monitoring apparatus shown in FIG. 1, there will be seen monitoring circuitry in the form of a relay circuit which is connected by means of an intermediate converter 1, for instance transformer means, with the not particularly illustrated conventional motor or its current and voltage converter. A rectifier 2 connected in circuit with the intermediate converter 1 generates a direct-current voltage U which is proportional to the motor voltage. A pulse converter 7 connected with the intermediate converter 1 transforms the sine-wave or sinusoidal motor voltage into a square wave signal of the same phase. A bipolar switch 11 is controlled by a gate 8 by means of this square wave signal and in conjunction with the filter 12 produces a direct-current voltage signal proportional to the product I . cos $\varphi$. For accommodation of the system to the rated motor current there is provided a load 15 which is connected by means of the intermediate converter 1 with the supervised motor. In a divider 3 there is formed the effective resistance R by dividing the direct-current voltage signal U by the product I . cos $\varphi$.

The voltage at the load 15 is not only used for forming the product I . cos $\varphi$, rather also in order to detect the beginning of the start-up of the motor. After turning-on the motor the current markedly increases. With a fixed given peak value, for instance I > 2 × $I_N$, wherein $I_N$ = the rated current of the motor, a trigger or trigger circuit 16 responds. However, since a trigger circuit only can react to a peak value, there are provided circuit means 17 for prolonging the pulses, in order to thereby form a continuous signal after the response of the trigger circuit 16. Following such response of the trigger circuit 16 and the pulse prolongation means 17, there are placed into operation the time-delay elements 22 and 13. The time-delay element 22 is set to a first time-delay $t_1$ amounting to, for instance, 0.1 seconds. This first time-delay $t_2$ serves the purpose of waiting for the decay of the direct-current components of the current before there is started the first resistance measurement by the relay circuit i.e. monitoring apparatus. The time-delay element 13 is set to a second time-delay $t_2$ which is greater than $t_1$, but at most equal to the permissible motor blocking time $t_E$.

After expiration of the first time-delay $t_1$ a first monostable multivibrator or monoflop 23 and the gates 24, 25 trigger a second monostable multivibrator or monoflop 26. The output 26a of this second monostable multivibrator 26 initiates for a certain number of periods, for instance 5, by means of the gates 18, 19, 27 the measurement of the product I . cos $\varphi$. If this measurement has been completed, then the value $R_1$ = U/I . cos $\varphi$, formed by the divider 3, is supplied by means of an analogue-digital converter 4 to a storage 5.

After expiration of the second time-delay $t_2$ there is brought about in corresponding fashion a measurement of the product I . cos $\varphi$. The correspondingly determined value of the effective resistance $R_2$ is compared in a comparator 10 with the value $R_1$ recalled at the storage 5 by means of a digital-analogue converter 6. Previously however, in an adder or summation circuit 9 there is added to the value of the effective resistance $R_1$ a value B serving as a safety margin. If the value $R_2$ of the second resistance measurement is greater than $R_1$ at least by this value B, then the start of the motor was successful and the trigger or cutoff relay 21 need not deliver any trigger command. If the value of the resistance of the second measurement is however smaller than the value of the resistance of the first measurement, increased by the safety margin B, then the thus monitored motor is blocked. The delay or monitoring circuit above described now delivers by means of the gate 14, the monostable multivibrator or monoflop 20 and the trigger relay 21 a trigger command for motor cutoff.

According to the modified system of FIG. 2, the inventive monitoring or relay circuit is connected by means of the intermediate converter 1 with the monitored motor or the current and voltage converter of such motor, respectively. A first pulse converter 7 connected with the intermediate converter 1 transforms the sine-wave or sinusoidal motor voltage into a square wave signal of the same phase, and a second pulse converter 7′ connected with the intermediate transformer 1 transforms the signal at the load 15 which has been accommodated to the sinusoidal motor current likewise into a square wave signal of the same phase. By means of the filter 12 there is determined the phase angle $\varphi$ between the motor current- and motor voltage-proportional signals. The initiation and determination of the duration of the measurement of the phase angles $\varphi_1$ and $\varphi_2$, the determination of the change as a function of time of the phase angle $\varphi$ during the start-up phase of the motor and delivery of the trigger command or fault signal occurs here also exactly as explained in detail for the preceding discussed embodiment of FIG. 1, where the effective resistance and not the phase angle was used as the governing or determination magnitude.

While there are shown and described present preferred embodiments of the invention, it is to be distinctly understood that the invention is not limited thereto, but may be otherwise variously embodied and practiced within the scope of the following claims. Accordingly,

What I claim is:

1. A method of monitoring the run-up to speed of asynchronous motors which are turned-off within a permissible blocking time of the motor when the speed run-up is improper, comprising the steps of:
   turning-on the monitored motor;
   determining a first electrical magnitude dependent upon the phase angle between the motor current and the motor voltage after expiration of a first time-delay following turning-on of the motor;
   determining a second value of said electrical magnitude which is dependent upon the phase angle between the motor current and the motor voltage after expiration of a second time-delay following turning-on of the motor;
   comparing both the first and second values with one another; and
   turning-off the motor when the comparison of the first and second values with one another produces a magnitude indicative of improper run-up to speed of the motor.

2. The method as defined in claim 1, further including the steps of:
   selecting the first time-delay such that direct-current components whhich arise during turning-on of the motor have essentially decayed; and
   selecting the second time-delay to be greater than the first time-delay but at most equal to the permissible blocking time of the motor.

3. The method as defined in claim 3, wherein:
   the second time-delay is smaller than the permissible blocking time of the motor.

4. The method as defined in claim 1, further including the steps of:
   employing an electronic measuring device and electronic timing device operatively connected with the motor;
   setting the first and second time-delays at the electronic timing device;
   setting a rated motor current at the electronic measuring device;
   initiating the measuring operation after exceeding a predetermined current peak value;
   storing the first value of the phase angle-dependent magnitude which has been determined after the first time delay;
   determining after expiration of the second time-delay the second value of the phase angle-dependent magnitude;
   adding to the first value a safety margin-value;
   comparing the first value increased by the safety margin-value with the second value; and
   turning-off the motor when the first value increased by the safety margin-value exceeds the second value.

5. The method as defined in claim 1, further including the steps of:
   using as the phase angle-dependent magnitudes the effective resistance of the motor.

6. The method as defined in claim 5, further including the steps of:
   utilizing a transformer having a load connected to its output for obtaining a motor current signal;
   utilizing said load for adjusting the magnitude of said motor current signal to the rated current of the motor;
   performing a triggering operation to initiate the course of the first and second time-delays;
   measuring the current I . cos $\varphi$ over a number of periods;
   determining in a divider the effective resistance of the motor during the first time-delay; and
   determining in the divider the effective resistance of the motor after expiration of the second time-delay.

7. The method as defined in claim 1, further including the steps of:
   employing as the phase angle-dependent magnitudes the phase angle itself between the motor current and motor voltage.

8. The method as defined in claim 7, further including the steps of:
   utilizing a transformer having a load connected to its output for obtaining a motor current signal;
   utilizing said load for adjusting the magnitude of said motor current signal to the rated current of the motor;
   employing a triggering operation to initiate the course of the first and second time-delay;
   determining the phase angle after expiration of the first time-delay by comparison of the phase of the motor current and the motor voltage; and determining the phase angle after expiration of the second time-delay by comparing the phase of the motor current and the motor voltage.

9. The method as defined in claim 1, further including the steps of:
employing as the phase angle-dependent magnitude the cosine of the phase angle between the motor current and motor voltage.

10. A method of monitoring the run-up to speed of asynchronous motors which are turned-off within a permissible blocking time of the motor when the speed run-up is improper, comprising the steps of:
turning-on the monitored motor;
forming a first electrical magnitude dependent upon the phase angle between the motor current and the motor voltage after expiration of a first time-delay following turning-on of the motor;
forming a second value of said electrical magnitude which is dependent upon the phase angle between the motor current and the motor voltage after expiration of a second time-delay following turning-on of the motor;
processing both said first and second values; and
obtaining from the processing step a motor trigger signal for turning-off the motor when the motor improperly runs-up to speed.

11. An apparatus for monitoring the run-up to speed of an asynchronous motor by detecting a rotational speed dependent-physical magnitude within a permissible blocking time of the motor, comprising:
means for converting current and voltage signals delivered by the motor;
means for initiating and determining the duration of the measurement of phase angle-dependent magnitudes of the monitored motor by forming a first value of an electrical magnitude dependent upon the phase angle between the motor current and motor voltage after expiration of a first time-delay following turning-on of the motor and by forming a second value of such phase angle-dependent magnitude after expiration of a second time-delay after the turning-on of the motor;
means for determining the changes as a function of time of the phase angle-dependent magnitude; and
means for delivering a trigger command for turning-off the motor.

12. The apparatus as defined in claim 11, wherein said means for initiating and determining the duration of the measurement of the phase angle-dependent magnitudes, comprises:
a trigger circuit;
pulse prolongation means cooperating with said trigger circuit;
a monostable multivibrator;
a first fixedly adjustable time-delay means for activating said monostable multivibrator after expiration of the fixedly adjustable first time-delay;
a second fixedly adjustable time-delay means for activating said monostable multivibrator after expiration of a fixed settable second time-delay.

13. The apparatus as defined in claim 12, wherein said means for determining the change as a function of time of the phase angle-dependent magnitudes comprises:
a storage for the recall of the first value determined after expiration of the first-delay;
an adder for increasing the first value by a safety margin-value; and
comparison means for comparing the first value increased by the safety margin-value with the second value.

14. The apparatus as defined in claim 11, wherein said means for converting the current and voltage signals delivered by the motor serves for the determination of effective resistances as phase angle-dependent magnitudes and comprises:
an intermediate converter for producing a direct-current voltage substantially proportional to the motor voltage;
a rectifier connected with said intermediate converter;
a pulse converter connected with the intermediate converter for transforming a substantially sinusoidal motor voltage into a square wave signal of the same phase;
a bipolar switch controlled by the square wave signal;
a filter for producing a direct-current voltage proportional to the product $I \cdot \cos \varphi$;
a load for accommodating the rated motor current; and
a divider for forming the effective resistance.

15. The apparatus as defined in claim 11, wherein said means for converting the current and voltage signals delivered by the motor serves for the determination of the phase angle-dependent magnitudes in the form of phase angles and comprises:
an intermediate converter for transforming an essentially sinusoidal motor voltage into a square wave signal of the same phase;
a first pulse converter connected with said intermediate converter;
a load for accommodating the rated motor current;
a second pulse converter connected with the intermediate converter for transforming the signal accommodated at the load to the motor current into a square wave signal of the same phase; and
a filter for determining the phase angle between signals which are proportional to the motor current and motor voltage.

* * * * *